Aug. 11, 1953  J. D. WOOD  2,648,803
CASCADED BREAKER SYSTEM
Filed March 29, 1950  2 Sheets-Sheet 2

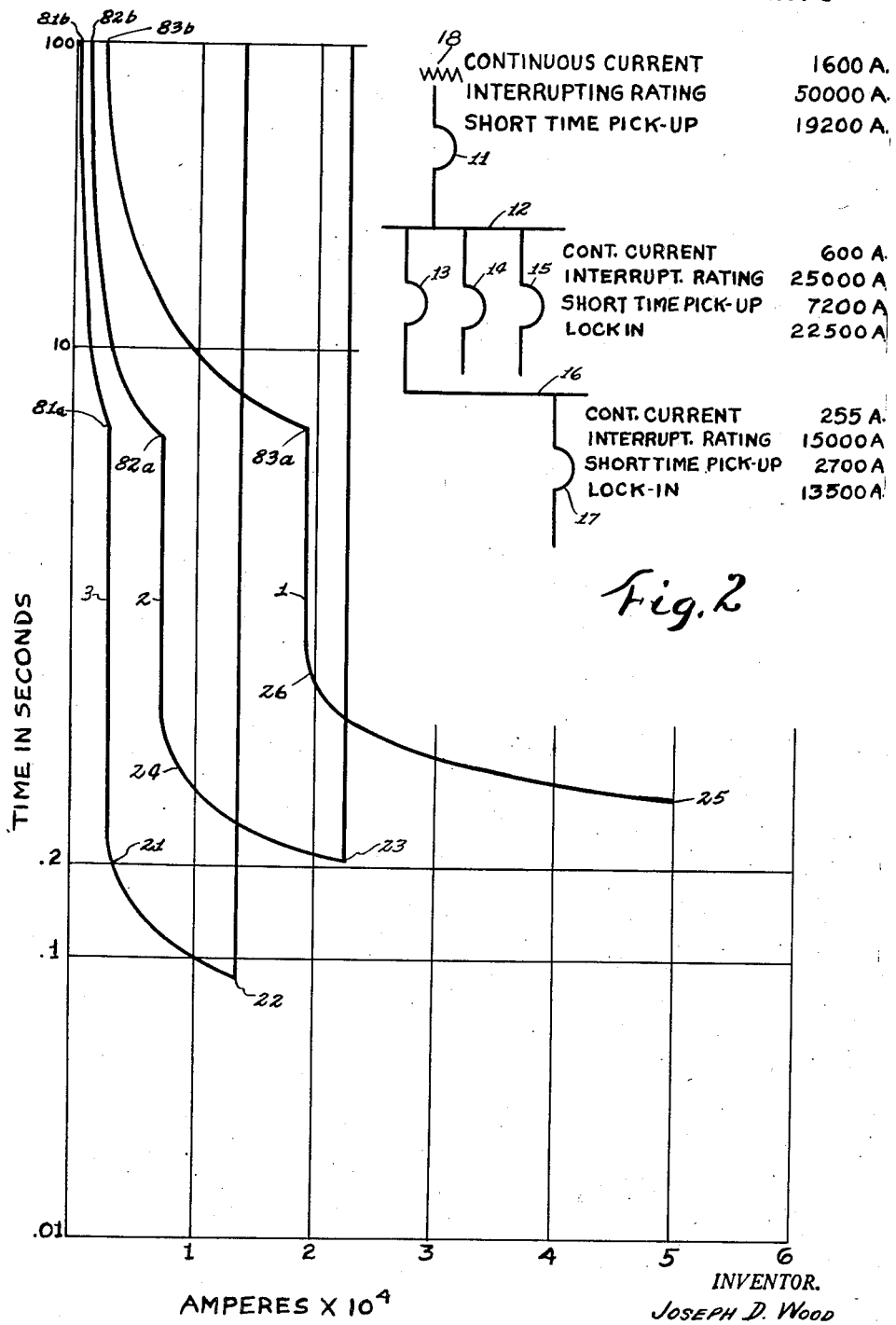

INVENTOR.
Joseph D. Wood
BY
Ostrolenk + Faber
Attorneys

Patented Aug. 11, 1953

2,648,803

UNITED STATES PATENT OFFICE

2,648,803

CASCADED BREAKER SYSTEM

Joseph D. Wood, Strafford Village, Teddyffrin Township, Pa., assignor to I-T-E Circuit Breaker Company, Philadelphia, Pa., a corporation of Pennsylvania Application March 29, 1950, Serial No. 152,674

6 Claims. (Cl. 317—35)

My invention relates to an electrical system, and more particularly relates to an electrical power system in which circuit breakers are connected in cascade.

In electrical distribution systems, circuit breakers protecting the source of electrical power are connected in electrical proximity to this source. Correspondingly there are breakers connected to the distribution circuit, the main feeder circuit, branch feeder circuits, and finally, circuit breakers for protecting individual loads.

In such systems there has recently been developed selective tripping systems. In such systems each of the circuit breakers in the system has an individual time current response characteristic to fault currents. The circuit breakers electrically nearest the load have shorter trip time characteristics for the same current than circuit breakers further removed from the load; i. e., the circuit breakers electrically closer to the source each having successively longer time current characteristics. Accordingly for the same fault current value it takes longer for the circuit breaker nearest the source to trip than the breaker more remote therefrom.

By this arrangement, as will now be apparent, the circuit breaker nearest the fault will open first in response to the fault, thus interrupting the minimum amount of system while still isolating the fault. Power interruption is thus reduced to a minimum. Such a system is described in Patent 2,439,165.

In such a system, circuit breakers in practice have the same interrupting capacity so that each can take care of any fault current that may occur. in practice, it has been found that the economics of system requirements, i. e., cost and space requirements of circuit breakers, makes it impractical to have all of the circuit breakers of sufficient interrupting capacity to interrupt the maximum calculated fault current that may occur in the system.

This is particularly true of enclosed switchgear units where the fault current beyond the branch circuit breakers may still not be substantially less than that which might occur at the main circuit breaker.

For such systems it has been found that it is best to use circuit breakers "cascaded," i. e., a series arrangement of circuit breakers in which the successive circuit breakers have successively graded interrupting capacities. In such a system the circuit breakers nearest the load have the lowest interrupting capacity.

In the conventional method of the application of circuit breakers in a cascade system, the following general practice of application is followed.

The circuit breaker nearest the source of energy has an interrupting rating equal to the maximum calculated available fault currents. As will be clear from the more detailed description which is to follow, this breaker must be capable of completely isolating the faulted circuit from the source of energy at whatever value of maximum fault current may be required and accordingly must have the necessary characteristic for achieving this result.

With the three series steps as herein illustrated, the third circuit breaker electrically positioned from the source should have an interrupting rating such that the maximum available fault current does not exceed 300% of the interrupting rating of this circuit breaker.

When circuit breakers are applied in cascade, the second breaker from the source must have an interrupting rating such that the maximum available fault current will not exceed 200% of the interrupting rating of this second stage circuit breaker.

Preferably, cascading should be limited to a maximum of three steps.

To obtain sufficient protection in such a system, all circuit breakers are supplied with instantaneous trip devices. Mechanical stresses due to the electromagnetic effects of the fault currents are alleviated in a short time by the use of instantaneous trip devices. The thermal requirements of each of the circuit breakers of the series arrangement are thus reduced so as to allow smaller size circuit breakers. Each instantaneous trip is set to operate at a current magnitude which is equal or less than 80% of the interrupting rating of the circuit breaker in the next lower step. Thus each breaker other than the main circuit breaker has back-up protection on fault currents from 80% of their interrupting capacity upward.

In most instances, the maximum available current on a distribution branch circuit breaker is within the interrupting rating due to the fact that the majority of the faults occurs at some distance from the relevant circuit breaker. The circuit impedance of the line is thus great enough to limit the fault current to a safe value. However, on faults close enough to the breaker, especially within a bussed structure, the resultant fault currents may approach the maximum available. In such an event the circuit breaker may not successfully interrupt the fault current successfully and the actual interruption is accomplished by the "backup" breaker. The contacts may be damaged due to the flow of arcing current until this occurs. Under these conditions it will be necessary that the circuit breaker be inspected and require repair or replacement. This is the calculated risk which is taken in the use of a "cascade" system.

The circuit breakers in a conventional cascaded system are provided with instantaneously operating trip elements set to operate in response to predetermined fault currents, this instantaneous trip value being related to the interrupting rating of the next smallest circuit breaker. Thus, for example, a breaker at the load end may have an interrupting rating of 15,000 amperes; that is to say, it can interrupt a fault current of 15,000 amperes but no more. In that case the next breaker electrically positioned toward the source would have an instantaneous operation of its trip magnet at about 12,500 amperes so as to be sure to trip in time to interrupt the fault which the preceding breaker does not have the capacity to clear. This same relative arrangement obtains for each pair of successive electrically adjacent circuit breakers.

Although the arrangement described above makes certain that a breaker having the necessary interrupting rating opens in time to interrupt the fault current, it was found in practice to place a severe burden on the smaller breaker in series with it which opened simultaneously with the larger circuit breaker but did not have the necessary interrupting capacity. The arc that formed across the contacts of this circuit breaker frequently damaged the contacts before it was extinguished by the operation of the larger circuit breaker.

I have discovered that inasmuch as only the circuit breaker which has the necessary interrupting capacity will in the end actually interrupt the fault, it is unnecessary to place any extra burden on the smaller circuit breaker. In accordance with the present invention I have so arranged the circuit breakers in the system that when the magnitude of a fault current approaches the interrupting rating of a circuit breaker at which value the next larger circuit breaker will actually take over the interruption of the fault, the smaller circuit breaker is locked-in against tripping and the next circuit breaker having the adequate interrupting rating opens to clear the fault. In accordance with this arrangement, no unnecessary burden is placed on the smaller circuit breaker and this circuit breaker is thus protected against damage under the conditions involved.

Accordingly an object of my invention is to provide a novel circuit breaker system in which a novel arrangement of circuit breakers connected in cascade is provided with mechanisms for detecting a fault current which is of the order of or in excess of the interrupting rating of the corresponding circuit breaker to prevent the unnecessary opening of its contacts on excessively high currents.

A further object of my invention is to provide a novel circuit breaker which is prevented from opening in response to a fault in excess of its interrupting rating.

In the proposed application of circuit breakers in cascade, each of the circuit breakers of the system is provided with direct-acting trip mechanism having two delayed time tripping elements in addition to its aforementioned lock-in feature. Thus, for overload currents, a time delay is provided which is of the order of seconds and substantially has an inverse time delay characteristic. For short circuit fault currents, a time delay is also provided of a direct-acting type in which the time delay is of the order of cycles in a 60 cycle system for current values up to the interrupting rating of the circuit breaker, and again substantially having an inverse time delay characteristic.

On currents at or above the interrupting capacity of the circuit breaker, I arrange to lock this circuit breaker against tripping of the latch mechanism. As stated hereinbefore, these time characteristic curves are individual to each of the circuit breakers in the cascaded system, the circuit breaker nearest the load having the shortest tripping time for any given current value, and the circuit breaker nearest the source having the longest tripping time for such given current value.

In such a system when a circuit breaker is to be closed, it may, as is often the case, close on a fault condition. Usually when this occurs, the circuit breaker heretofore employed being provided wtih "trip free" mechanism, the trip mechanism will function the moment the circuit breaker is closed to instantly trip the circuit breaker even though closing forces are still being applied as illustrated in Patent 2,348,228. Where, however, as in the present system a direct acting time delay mechanism is employed, when the contacts of the breaker are closed on a fault current, the time delay prevents instantaneous opening of the contacts. At the same time the closing mechanism is functioning to tend to close the contacts.

The fault current flowing through the movable arm will set up electromagnetic forces called "blow open" forces tending to drive the contacts apart. These forces are such as to oppose the closing force applied. As a result when the contacts are first closed, the magnetic forces acting against the closing forces drive the contacts apart to open the circuit. Thereupon since the closing force is still acting, the contacts reclose. This cycle of alternately opening and closing of the contacts may continue until the contacts are destroyed.

The trip magnet retarded by the time delay mechanisms does not have an opportunity to release the trip free latching mechanism during this short time interval that the contacts remain substantially in partial engagement to complete a tripping action and the contacts through inadequate contact engagement are fused and destroyed.

It is accordingly an essential characteristic of any cascade system that provision be made to ensure contact engagement and latching against a fault current. To this end I provide in my system an arrangement whereby while the contacts are being moved to contact engagement, any electromagnetic forces set up due to a fault current when the contacts engage and before the contacts are latched in engagement will act to force the contacts into closer engagement. This is hereinafter called "blow closed" action. This "blow closed" action which occurs before the contacts are latched in engagement thus helps the applied closing force to complete contact latch engagement against a fault current flow.

The time delay trip mechanism will thereupon come into operation to effect tripping action in the time delay period provided for that particular fault current. Upon tripping, the electromagnetic forces are arranged to be in a direction to assist the tripping action, as is the practice, providing a "blow open" action. Thus I achieve in the same circuit breaker "blow closed" action during the closing operation before the contacts are latched in engagement and "blow open" action during the tripping operation. This is more fully described in my co-pending application Serial No. 127,562, filed November 16, 1949.

Accordingly a further object of my invention is to provide a novel cascade system in which each circuit breaker is provided with individual time-current characteristics on both overload and on fault currents and "blow open," "blow closed" operating characteristics of the circuit breaker apparatus.

A further object of my invention is to provide a novel cascade system in which each of the circuit breakers of the system is provided with a lock-in mechanism on the trip magnet which becomes operative when the fault current flow approaches the interrupting rating of the corresponding circuit breaker and in which each circuit breaker is provided with "blow open," "blow closed" mechanisms.

There are other objects of my invention which will become apparent when taken in connection with the accompanying drawings in which:

Figure 1 shows a group of time-current characteristic curves of a plurality of circuit breakers arranged in cascade in accordance with my invention.

Figure 2 is a typical one-line schematic circuit diagram of a plurality of circuit breakers arranged in cascade.

Figure 3:
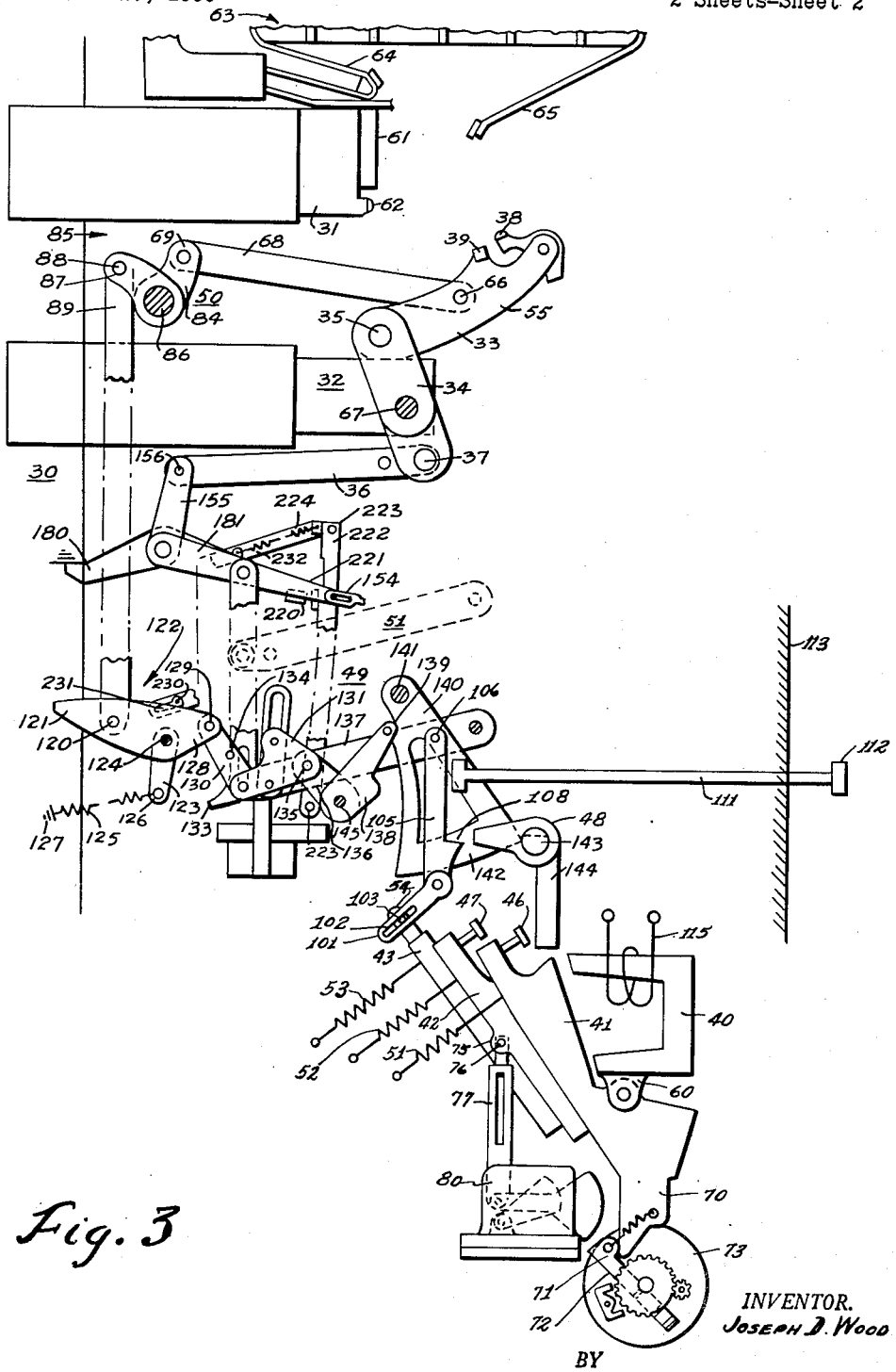
Figure 3 is a schematic view of the elements of the circuit breaker showing the lock-in feature operative in response to a fault current in excess of the interrupting capacity of the circuit breaker.

Referring to Figure 2, I have schematically shown here a circuit breaker 11 adjacent to a generator or other source of power 18. Circuit breaker 11 is connected to a tie bus 12 to which individual branches having circuit breakers 13, 14 and 15 are connected. The circuit breaker 13 in turn is connected to a tie bus 16 from which individual load circuits protected by individual circuit breakers, such as 17, extend as shown.

The load breaker 17 in my particular illustration is shown as a circuit breaker having a continuous current carrying capacity of 255 amperes; an interrupting rating of 15,000 amperes; a short time pick-up of 2700 amperes; and a lock-in at 13,500 amperes. These characteristics mean that at full load current value of 255 amperes, the circuit breaker trip mechanism will not respond. If, however, the continuous current exceeds 255 amperes for a given interval of time, the trip mechanism will respond. The time of response will of course vary depending upon the magnitude of the overload current.

For example, in the curve 3 shown in Figure 1 for circuit breaker 17, if approximately 1250 amperes flows continuously for 10 seconds, circuit breaker 17 will trip. Should the fault current, however, reach fault current values, such as in excess of 2700 amperes, the short time pick-up which functions approximately between current values corresponding to points 21 and 22 of curve 3, becomes effective and the tripping of the circuit breaker 17 opens the circuit in from .09 to .2 second or time measurable in cycles in a 60 cycle system. However, if the fault current should exceed 13,500 amperes, which occurs at point 22 on curve 3, a lock-in element (to be described hereinafter) becomes effective to lock in the circuit breaker 17, thus preventing its contacts from opening at any current in excess of 13,500 amperes, which in this case is below the 15,000 ampere interrupting rating of circuit breaker 17.

Circuit breaker 13, which is the next larger circuit breaker in the cascaded system, has in the present illustration a continuous current rating of 600 amperes which means that so long as the load current is 600 amperes or less, no portion of the tripping mechanism will respond. Should the current rise above 600 amperes for any given period of time, the trip mechanism of the circuit breaker will operate, but as shown in connection with the curve 2, the time characteristics for any current in the overload ranges are longer than for the next smaller breaker 17, shown in curve 3.

Thus, for a continuous overload current of about 2700 amperes, the circuit breaker 13 would take about 10 seconds before it would be tripped, thus permitting the circuit breaker 17 to interrupt that fault current flow in approximately .2 second. In fact, circuit breaker 13 will not trip for any currents up to lock-in setting of the next smaller breaker unless the fault currents were the result of the joint overloads of a number of load circuits, none of which themselves were overloaded. Under this latter specific joint overload condition, it is proper that circuit breaker 13 should function to interrupt the faulty current flow.

The circuit breaker 13 has an interrupting rating of 25,000 amperes and as shown at 23 is provided with a lock-in element at a current value below this interrupting rating of 25,000 amperes, namely at approximately 22,500 amperes. The short time pick-up for this circuit breaker 13 functions at 7200 amperes.

The circuit breaker 11 has a continuous current rating of 1600 amperes; an interrupting rating of 50,000 amperes; and a short time pick-up of 19,200 amperes. The lock-in element is not present on the circuit breaker 11 inasmuch as it is required that its interrupting rating be equivalent to the maximum current flow available.

Referring to Figure 3, a circuit breaker of the blow open, blow closed type shown in application Serial No. 127,562, filed November 16, 1949, is disclosed for use in the present novel system. The circuit breaker is provided with a magnet 40 energized by fault currents in a manner well known in the art, the winding of this magnet being connected usually in series with the power line which is being protected by the particular circuit breaker.

The magnet 40 is provided with the armatures 41, 42 and 43. As will be described in detail hereinafter, when an overload fault current up to a predetermined value determined by calibrated spring 52 energizes magnet 40, the armature 42 starts to move toward the pole face of magnet 40. However, armature 42 is connected to a long time delay mechanism which delays its movement over a long time range indicated by the long time ranges of curves 1, 2 and 3.

If the fault current is a short cricuit up to a predetermined range determined by calibrated spring 51, armature 41 starts to move but is delayed in its movement over a short time range indicated by the short time ranges of the curves 1, 2 and 3.

If the fault current is in excess of this last predetermined value, armature 43 controlled by calibrated spring 53 moves instantaneously toward the pole face of the magnet 40.

Armatures 41 and 42 each have secured thereto individual projections 46 and 47, each adapted when their respective armatures move to engage trip latch member 48. Trip latch member 48 when it is rotated trips the circuit breaker main movable contact arm in the manner described in detail in application Serial No. 127,562 referred to above.

Armature 41 pivoted at 69 is provided at its one end thereof with an extension 70 engaging a short time delay mechanism of the type described in application Serial No. 148,696, filed March 9, 1950.

Basically the short time delay member 73 is an escapement mechanism having a verge which retards the rotation of the lever 72 in response to the attraction of armature 41 to magnet 40. Lever 72 bears against the lower extension 70 of the short time armature 41 so that when the short time armature 41 moves from the full open position toward the trip position in response to excess fault current flow and before it completes its full trip stroke, it must rotate the lever 72 in a counterclockwise direction as the armature 41 rotates in a clockwise direction.

Since the armature 41 cannot rotate toward tripping position without rotating the lever 72 in an opposite direction, the escapement mechanism retards its speed of rotation and therefore controls the speed of movement of the armature 41 to the full trip position, all as fully described in the above-identified application.

Thus, the escapement mechanism shown in more detail in the above-identified application Serial No. 148,696 controls the time of movement of the armature 41 to the trip position to effect the required short time delay operation by the armature of the tripping mechanism over the range from 21 and 22 of circuit breaker 17 and corresponding short time delay ranges 24 and 23 to 26 and 27, respectively, for circuit breakers 13 and 11.

Armature 42 is provided with an ear 76 from which extends a link 77 connected to a long time delay mechanism 80 shown in application Serial No. 148,696. This, as described in that application, is a dashpot construction which prevents movement of armature 42 for a period of time measurable in seconds.

When either armature 41 or 42 moves to a closed position against the pole face of the magnet 40 on energization of the magnet 40, the associated extensions 46 or 47 depending on which armature has been moved impinges on the tripper bar 48 of the circuit breaker latching mechanism 49 to trip the circuit breaker. The operating mechanism 49 is connected by linkage 50 to the contact arm 55 and may be remotely controlled by the operating handle 51. The details of the latching mechanism, the movable contact arm and closing mechanism are, as stated above, more fully shown and described in application Serial No. 127,562.

A support member 30 carries an upper stud 31 and a lower stud 32 for each pole of the circuit breaker structure. The contact arm 55 is a two-piece arm consisting of the elements 33 and 34 pivotally connected at the pivot 35 adjacent the stud 32 in current carrying engagement therewith, and is pivotally connected to a link 36 by pin 37.

The upper end of element 33 of the composite movable contact arm 55 is provided with a movable arcing contact 38 and a movable main contact 39 which engages respectively with the stationary arcing contact 61 and the stationary main contact 62 mounted on the upper stud 31. The structures of these contacts, the structure of the blow-out coil and arc chute, generally indicated at 63 and the arcing horns 64 and 65 are fully described in the co-pending application Serial No. 721,648.

The closing pivot for the movable contact member 55 is essentially the pin 66 which, during the closing movement, remains substantially or relatively stationary as hereinafter described. As is apparent from the drawing, the distance from pivot 66 to the main moving contact 39 is smaller than the distance from pivot 66 to the lower stud 32.

The closing force is applied at pin 37 and the link 22 thus operates in a clockwise direction about the pivot 67, moving the pivot pin 35 towards the right with respect to Figure 3. Since the pin 66 after the initial movement to the left is substantially stationary this results in a counterclockwise rotation of the link element 33 of contact arm 55 about the pin 66 to the contacts (38—39 and 61—62) into engagement.

As the contacts (38—39 and 61—62) come into engagement a current flow is produced through stud 32, circuit breaker contacts (38—39 and 61—62) and stud 31.

This loop current sets up electromagnetic lines of flux which will exert a force on the composite arm 55 tending to drive contacts 38, 39 and 61, 62 out of engagement. The effect of this force will depend on the magnitude of current and the length of the composite arm 55 within the loop of current.

Pivot pin 35 continues to move to the right at the time of closing of the circuit breaker. The length of the contact arm 55 from pivot 66 to pivot 35 is longer in length than the portion of the contact arm 55 from pivot 66 to the arcing contact 39. The portion of the contact arm 55 below pivot 66 thus has greater length so that when current starts to flow in composite arm 55 this lower portion is driven counterclockwise about pivot 66 by the magnetic flux and overcomes the corresponding magnetic flux blow-open force above the pivot 66 which tends to drive the portion of the contact arm 55 above pivot 66 away from the stationary contacts 61 and 62. Consequently, the resultant of component magnetic forces drives contacts 38 and 39 home against the stationary contacts 61 and 62. Thus a blow-closed effect is achieved during closing movement as soon as the contacts are engaged or current flows in the composite arm 55.

When the contact arm 55 is moving from the closed circuit position to the initial open circuit position then pivot 66 ceases to be a fixed pivot and instead pivot 35, as hereinafter described, becomes the stationary or opening pivot and the opening force is applied to the contact arm 55 at pivot 66, moving the arm 55 about pivot 35 to the right in a clockwise direction. Following the initial tripping movement opening pivot 35 ceases to be a stationary pivot and moves to the left to completely open circuit breaker contacts 38—39 and 61—62. The opening spring force of the circuit breaker mechanism is thus aided by the magnetic flux due to the fault currents which is effective over the entire length from the circuit breaker contacts 38—39 and 61—62 to the pivot 35 and thus all of the magnetic force due to the fault currents on the composite contact arm 55 is now in the blow-open direction with respect to the contact members 38—39 and 61—62. This blow-open feature is made possible by having pivot 35 stationary while pivot 66 is free to move at this instant.

The shifting of the pivot points 66 and 35 so that pivot 66 is utilized as pivot during final phase of the closing stroke and pivot 35 is utilized during major part of opening stroke thereby making it possible to obtain a blow-closed effect during closing of the contacts 38—39 and 61—62 and a blow-open effect during opening of the contacts 38—39 and 61—62.

The linkages which perform the operation of closing and opening the circuit breaker contacts 38—39 and 61—62 and cause pivot 66 to remain stationary following initial closing operation and movable during the entire opening operation while also causing pivot 35 to be movable during the entire closing operation and stationary during initial opening operation are described hereafter.

Pin 66 is connected to the connecting arm 68 of linkage 50, the opposite end of which is connected by pivot 69 to the arm 84 of the bell crank lever 85. The bell crank lever 85 is stationary pivoted on the pin 86.

The opposite arm 87 of the bell crank lever 85 is connected by pin 88 to the connecting link 89. The lower end of connecting link 89 is connected by pin 120 to the arm 121 of the three-arm lever 122. The second arm 123 of the three-arm lever 122 is keyed by pin 124 to the arm 122 in bell crank relation therewith. The opening tension spring 125 is connected between pin 126 at the end of arm 123 and a stationary anchoring point 127 in the housing of the circuit breaker. It will thus be seen that the tendency of tension spring 125 to collapse results in biasing of pin 126 towards the stationary point 127 to which the spring 125 is connected.

This results in a clockwise bias of the three-way arm 122 around the pivot 124. This clockwise bias on arm 122 results in an upward bias on link 89 and thereby results in a clockwise bias on the bell crank lever 85. This in turn results in a bias on connecting arm 68 towards the right, thereby resulting in a similar bias on the pin 66 and a clockwise opening bias of the contact arm link 33. Spring 125 thus biases the movable contact arm 33 toward current opening position.

The third arm 128 of the three-way arm 122 is connected by the pin 129 to the latch link 130 which cooperates in the manner hereinafter described with other elements of the operating toggle mechanism to resist the opening bias of the spring 125 until a tripping operation occurs.

Latch link 130 is in toggle relation with link 131, being connected thereto by the knee pin 132. Link 131 is extended to the left beyond the knee pin 132 with a supporting finger 133 which extends under the pin 134 on latch link 138 to prevent toggle elements 130—132—131 from further rotation upwardly after it passes through center as hereinafter described to be locked in extended position. Although the toggle elements 130—132—131 cannot further rotate upwardly through center, it is free after release of other toggle elements hereinafter described to break downwardly. A collapse of the toggle elements 130—132—131 will permit clockwise rotation of the three-way arm 122 in response to the bias of tension spring 125 and thereby permitting, as above described, the opening of the circuit breaker contacts 38—39 and 61—62, with pivot 35 as the stationary pivot during initial opening operation.

The opposite end of link 131 is connected by pin 135 in toggle relation with the arm 136 of bell crank latch 137. The other arm 138 of the bell crank lever 137 is the secondary latch arm which rests on the latching surface 139 of the secondary latch 140.

The secondary latch 140 is pivotally mounted on the pivot 141 and has a latching surface 142 bearing against the milled shaft 143. The milled shaft 143 is provided with a crank arm 48, described above, which may be engaged on upward movement of the push pin 144 of the trip armature to trip the circuit breaker open.

As will be apparent from the drawing, the forces are distributed through the toggle mechanism elements so that the circuit breaker opening force of tension spring 185 results ultimately in a clockwise bias on bell crank latching arm 137 around its pivot 145. This results in downward pressure of the secondary latch arm 138 on the secondary latching surface 139. Latching surface 139 is so curved and placed with respect to the pivot 141 of latch 140 that the bias of tension spring 125 exerts a counterclockwise bias on latch arm 140 about the pivot 141 tending to force it against the milled shaft 143.

The milled latch type of latching arrangement is of the type fully described in Patent No. 2,390,735 and requires no further specific description here. It is sufficient to point out that shaft 143 is milled through to a line just beyond 180° at the area at which latching extension 48 registers with the milled shaft 143.

After the circuit breaker contacts 38—39 and 61—62 move to closed circuit position, since the spring 125 has been extended slightly beyond the point where its extended position can be supported by the latching bell crank lever 137, and additional latch is required to ensure that the circuit breaker will be closed even if the blow-closed condition which holds it closed should momentarily lapse owing to a temporary reduction in current.

For this purpose, crank arm 181 keyed to the shaft 154 is provided with a transverse latch roller 220 which sets upon the latching detent 221 in the vertical latch bar 222 pivotally mounted on pivot 223 and urged into latching engagement with latch roller 220 towards the left by the tension spring 224. As the latching bell crank lever 137 collapses, permitting the three-way arm 122 to rotate in a clockwise direction, the vertical latch arm 222 is pushed to the right around its pivot 223 by pin 230 carried by the three-way arm 122 and engaging in the slot 231 of the push link 232 connected at pivot 233 to the latch bar 222.

The latch bar 222 is not pushed out of the way until substantial rotational movement of the three-way arm 122 has occurred owing to the fact that pin 230 rides in slot 231 and does not engage the right-hand end of slot 231 until the three arm lever has almost completed its full clockwise rotation. Latch roller 220 remains in engagement wtih latching detent 221 so that pivot 35 is held stationary by link connection 155, 36 and crank arm 181. Consequently, the initial opening movement of the circuit breaker contacts 38—39 and 61—62 occurs with pivot 35 held stationary and pivot 66 free to move thereby utilizing the full blow-open effect of the relatively long lever arm from the movable main contact 39 to pivot 35. After the initial blow-open effect, pin 230 strikes the end of slot 231 driving latch bar 222 to the right and releasing latch roller 220 from latching detent 221 allowing crank arm 181 and the closing crank 153 to fall so that full collapse of the contact members 38—39 and 61—62 may occur.

As will now be clear from the above description, each of the circuit breakers is provided with a long time delay which will give a time characteristic, such as shown in the upper curved portions 81a to 81b, 82a to 82b, 83a to 83b of curves 1, 2 and 3, and is also provided with a short time delay mechanism for providing characteristic curves as shown in the lower curve portions 21 to 22, 23 to 24, 25 to 26 of curves 1, 2 and 3.

As stated in the above, in addition to the long time delay and short time delay elements described, circuit breakers 13 and 17 are provided with a lock-in mechanism which operates only in response to a short circuit current approaching the interruption rating of the circuit breaker. This is accomplished by the third armature 43 which is arranged to be attracted by the magnet 40 when current flowing through the magnet 40 approaches a value corresponding to current in excess of the interrupting rating.

In actual practice, it is desirable that the lock-in shall become effective at some value just below the interrupting rating. This is accomplished in the case of circuit breaker 13 having an interrupting rating of 25,000 amperes at a value of 22,500 amperes and for circuit breaker 17 having an interrupting rating of 15,000 amperes at 13,500 amperes.

The armature 43 is biased by its spring 53 so that it does not respond to energization of the magnet 40 by currents below the lock-in value. When, however, such current values energize the magnet, the armature 43 is attracted substantially instantaneously. A pin 103 in extension 54 moves in the slot 102 of link 101 to the right as viewed in Figure 3. When the pin 103 has moved a predetermined distance, the pin 103 in the slot 102 engages the right-hand end of the slot 102 and rotates the latching lever 105 in a counterclockwise direction about the pin 106 on which it is pivotally mounted.

When the lever 105 is rocked counterclockwise, its latching surface 108 engages the undersurface of the trip lever arm 48 thus locking the lever against counterclockwise rotation under the action of the tripping members as described above. Since the armature 43 will operate substantially instantaneously in response to the fault current, it moves the arm 105 into locking position before either of the other armatures 41 and 42 connected to time delay mechanisms can act and thus the trip latch 48 is prevented from operating in response to a fault current should the lock-in armature 43 function.

As will now be apparent, the short time delay mechanism of each circuit breaker is individually adjusted so that the short time timer of circuit 17 has the time-current characteristic of curve 21—22; circuit breaker 13 has the time-current characteristic of curve 23—24; circuit breaker 11 has the time-current characteristic of curve 25—26.

In this manner, if the fault is in the circuit of circuit breaker 17 and the fault is of a value that circuit breaker 17 can extinguish, this circuit breaker will open and only this portion of the system will lose power. If the fault current is of a value which circuit breaker 17 cannot extinguish, it will not attempt to do so. Instead its tripper bar will be locked against opening and circuit breaker 13 will, if the fault current is of the value this latter circuit breaker has the capacity to interrupt, open. In this case, of course, more of the system loses power. This same relative operation will apply to circuit breakers 13 and 11.

Summarizing the above, it will be observed now that by a proper coordination of the short time characteristics, each of the circuit breakers is prevented from opening on a fault current in excess of its maximum interrupting rating until a circuit breaker with a higher interrupting rating has the opportunity to clear the fault. Thus a circuit breaker is spared having the duty of opening a current above its interrupting rating with resulting damage to the circuit breaker.

In substance, in the example given, three circuit breakers of varying interrupting capacities are arranged in cascade in such a manner that a short circuit current beyond circuit breaker 17 causes a fault current to flow through the series arrangement of circuit breakers.

It will be noted that the lock-in for each circuit breaker is set to operate at approximately 90% of its interrupting rating. These settings are dictated by load requirements and the coordination requirements of the system. The true cascade principle of the setting of the short time armature to 80% of the interrupting rating of the next lower breaker is thus utilized.

It will also be noted that the basic concept of the conventional cascading, namely of using instantaneous trip devices, is also violated.

Inasmuch as it is desirable to inspect circuit breakers which have momentarily carried currents in excess of their rated interrupting rating, I provide a rod 111 mounted so that its left end is in the path of movement of the arm 105. When the arm 105 is operated in the manner described above, it will engage the left end of rod 111 and move the rod 111 to the right. Rod 111 extends through the front of the switchgear cubicle panel 113. This will serve to provide operation of an indicating target (112) and will further provide means for re-setting the rotating member 105 to its original non-operating position by movement of the rod 111 to the left.

As described hereinbefore, a circuit breaker in a cascade system as herein described may be closed at a time when a fault condition obtains in the circuit and provision must accordingly be made for preventing chattering of the contacts in the event this occurs.

Although in the above I have described one form of my invention, it will be clear that it may be used with other forms and I do not intend to limit myself except as set forth in the appended claims.

I claim:

1. In an electrical system having a plurality of circuit breakers connected in series, the interrupting capacity of the successive breakers being progressively less for the circuit breaker nearer to the load, each of said circuit breakers having a current responsive means and a long time delay mechanism operable in response to overload currents and having a time of operation measurable in the order of seconds and a short time delay mechanism responsive to fault currents and operable in periods of time of the order of cycles, the long and short time delay mechanisms for each of said circuit breakers being individual to each circuit breaker and being of decreasing time for the same current values for the circuit breakers nearer to the load, each of said circuit breakers having a fixed contact, a movable arm carrying a movable contact engageable with the fixed contact, a latch device for holding said movable contact in engagement with said fixed contact, a trip mechanism, and a connection from said movable arm to the trip mechanism constructed so that after said latch releases said movable arm, the electromagnetic forces set up tend to drive the contacts apart, and before said latch latches said contacts in engagement the electromagnetic forces set up by the currents flowing through the contact tend to drive the contact into engagement, and means operative in response to fault currents at or just below the interrupting rating of the breaker for locking said breaker against tripping in response to such fault currents, said means comprising an armature and a latch; said latch directly preventing the operation of said trip.

2. In an electrical system having a plurality of circuit breakers connected in series, the interrupting capacity of the successive breakers being progressively less for the circuit breakers nearer to the load, each of said circuit breakers having a current responsive means and a long time delay mechanism and a short time delay mechanism for controlling the time of response of the associated current responsive means, the time delay mechanism for each circuit breaker being individual to its associated circuit breaker and having a shorter time current characteristic for circuit breakers closer to the load, a lock-out mechanism for each circuit breaker controlled by its associated current responsive means and a mechanism controlled by said current responsive means to operate instantaneously in response to a fault current of the order of the interrupting capacity of the associated circuit breaker for operating said lock-out mechanism to prevent tripping of said circuit breaker, individual to and controlled by said circuit breaker and a target for indicating which of said circuit breakers have been locked in by excessive current, each of said circuit breakers having a fixed and a movable contact, means for biasing said movable contact to disengage said fixed contact, a latch for normally maintaining said movable contact in engagement with said fixed contact against the action of said biasing means, an electromagnet responsive to fault currents having a first armature controlled by said long time delay, a second armature controlled by said short time delay for tripping said latch to effect disengagement of said contacts and a third armature, said third armature being part of said lock-out mechanism and effecting a direct mechanical locking of said circuit breaker.

3. A circuit breaker of a predetermined interrupting capacity and having a fixed and a movable contact, means for biasing said movable contact to disengage said fixed contact, a latch engaging means for normally maintaining said movable contact in engagement with said fixed contact against the action of said biasing means, an electromagnet having an armature responsive to fault currents for tripping said latch to effect disengagement of said contacts, another armature controlled by said electromagnet when said magnet is energized by fault currents in excess of said interrupting capacity and a latch pivotally connected to said last mentioned armature engageable with said first latch to prevent disengagement of said contacts.

4. A circuit breaker of a predetermined interrupting capacity and having a fixed and a movable contact, means for biasing said movable contact to disengage said fixed contact, a latch engaging means for normally maintaining said movable contact in engagement with said fixed contact against the action of said biasing means, an electromagnet having a first and a second armature and a movable arm, said first armature being operable when said electromagnet is energized by currents below the interrupting rating of said circuit breaker for operating said latch to effect disengagement of said contacts and said second armature being pivoted to said movable arm and operable when said electromagnet is energized by currents equal to or greater than said interrupting rating for rotating said movable arm to directly latch said first mentioned latch in closed position preventing disengagement of said contacts.

5. A circuit breaker of a predetermined interrupting capacity and having a fixed and a movable contact, means for biasing said movable contact to disengage said fixed contact, a latch engaging means for normally maintaining said movable contact in engagement with said fixed contact against the action of said biasing means, an electromagnet having a first and a second armature and a movable arm, said first armature being operable when said electromagnet is energized by currents below the interrupting rating of said circuit breaker for operating said latch to effect disengagement of said contacts and said second armature being pivoted to said movable arm and operable only when said electromagnet is energized by currents of the order or greater than said interrupting rating for rotating said movable arm to directly latch said first mentioned latch in closed position preventing disengagement of said contacts.

6. A circuit breaker of a predetermined interrupting capacity and having a fixed and a movable contact, means for biasing said movable contact to disengage said fixed contact, a latch engaging means for normally maintaining said movable contact in engagement with said fixed contact against the action of said biasing means, an electromagnet having a first, a second, and a third armature; a movable arm; a long time delay and a short time delay; said first and second armature being operable when said electromagnet is energized by currents below the interrupting rating of said circuit breaker for operating said latch to effect disengagement of said contacts, said first armature being activated by relatively high currents and having its movement controlled by said short time delay, said second armature being activated by relatively small currents and having its movement controlled by said long time delay, and said third armature being pivoted to said movable arm and operable when said electromagnet is energized by currents equal to or greater than said interrupting rating for rotating said movable arm to directly latch said first mentioned latch in closed position preventing operation of said latch to effect disengagement of said contacts.

JOSEPH D. WOOD.

References Cited in the file of this patent

UNITED STATES PATENTS

| Number | Name | Date |
| --- | --- | --- |
| 799,790 | Hilliard, Jr. | Sept. 19, 1905 |
| 1,124,599 | Fessenden, Jr. | Jan. 12, 1915 |
| 1,253,207 | Brown | Jan. 15, 1918 |
| 1,530,443 | Traver | Mar. 17, 1925 |
| 1,763,258 | Ross | June 10, 1930 |
| 1,790,193 | Wood | Jan. 27, 1931 |
| 2,451,962 | Lindstrom et al. | Oct. 19, 1948 |
| 2,486,613 | Ridgley | Nov. 1, 1949 |
| 2,488,745 | Stratton | Nov. 22, 1949 |
| 2,617,861 | Ridgley | Nov. 11, 1952 |